Figure 1:
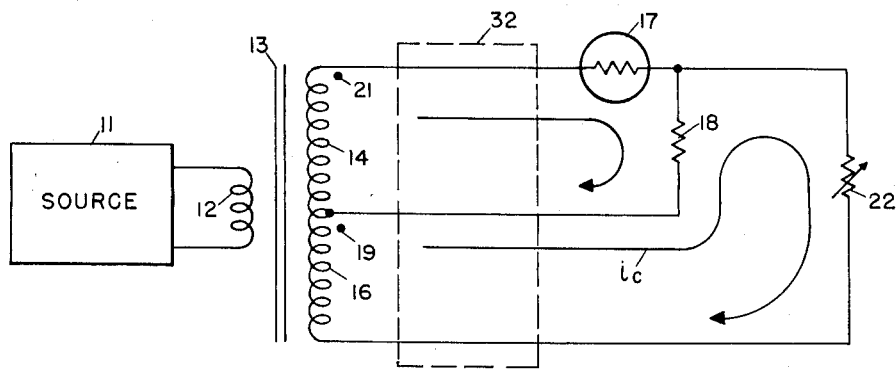

Feb. 7, 1956 — C. F. AULT — 2,734,163
REGULATING CIRCUIT
Filed Dec. 31, 1954

INVENTOR.
CYRUS FRANK AULT
BY *Darby & Darby*
ATTORNEYS

2,734,163

REGULATING CIRCUIT

Cyrus Frank Ault, Clifton, N. J., assignor to Allen B. Du Mont Laboratories, Inc., Clifton, N. J., a corporation of Delaware Application December 31, 1954, Serial No. 479,026

5 Claims. (Cl. 321—18)

This invention relates to current regulating circuits and in particular to those circuits utilizing iron-hydrogen regulating devices and the like.

When it is desired to limit to a certain value the current flowing through a particular load impedance it is common to insert in series with the load impedance a current regulating element, such as an iron-hydrogen device. However, iron-hydrogen devices, in common with other electrical regulating elements, are characterized by a current-voltage relationship in which the current through the regulating element increases rapidly with an increase in the voltage applied across the element until the current reaches a certain level. Then the current remains practically fixed at that level as the voltage is increased by a relatively large amount. Unfortunately, the current does not remain precisely fixed at the certain level but continues to increase at a rate much slower than the initial rate. Therefore, the current through the load impedance in series with the regulating element also increases, or changes, from its nominal value.

In order to cancel this small remaining current variation, the present invention contemplates the use of an auxiliary source of voltage which is affected simultaneously with the source of voltage that supplies the main current to the load impedance. The auxiliary source is so connected as to supply to the load impedance a current which partially opposes the main current. By connecting a current regulating element of the aforementioned type in series with the source supplying the main current, that current is substantially regulated to its nominal value. It remains only to adjust the opposing, or negative, current supplied by the auxiliary source to cancel out the small variation from the nominal current. Regulation is therefore more promptly instituted and thereby prevents any change in current that would otherwise occur in the load impedance.

It is therefore an object of this invention to provide a regulating circuit which substantially cancels any change of current in the load impedance.

This object and others will become apparent from the following specification taken in connection with the drawing.

Figure 2:
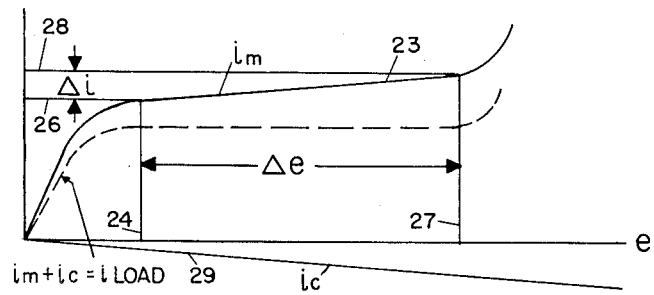
Figure 3:
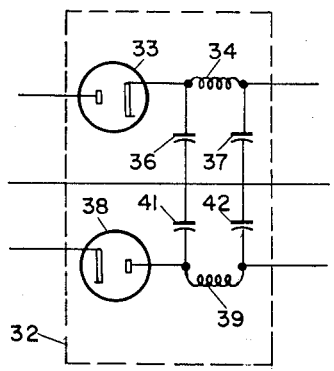

For a better understanding of my invention, reference is made to the drawings, of which Fig. 1 is a schematic representation of a regulating circuit utilizing my invention as applicable to alternating current circuits;

Fig. 2 shows the current-voltage relationship of the current regulating element in Fig. 1; and Fig. 3 is another embodiment of my invention as utilized in connection with direct current circuits.

Referring now to Fig. 1 the current regulating circuit comprises an alternating voltage source 11 connected to the primary winding 12 of a transformer 13. In the particular embodiment, transformer 13 has a tapped secondary winding consisting of a first section 14 and an auxiliary section 16. It will be appreciated by those skilled in the art that sections 14 and 16 could be entirely separate windings or could even be windings on separate transformers provided both transformers were energized by source 11.

Section 14, which may also be referred to as a load winding of transformer 13, is connected in a closed loop circuit with an iron hydrogen regulator 17 and a load impedance 18. The auxiliary section 16 which, as indicated by the customary dots 19 and 21, is in series aiding connection with section 14, is connected in series with a correcting impedance 22, shown here as a variable rheostat. The auxiliary winding 16 and the correcting impedance 22 form a series branch which is connected in parallel with the load impedance 18.

In the operation of the circuit of Fig. 1 source 11 supplies a voltage which is transmitted to the sections 14 and 16 of the secondary windings of transformer 13. So far as the load impedance is concerned, sections 14 and 16 may be considered as separate voltage sources which are characterized by voltage outputs which vary in proportion to the number of turns making up sections 14 and 16. Thus, if source 11 normally has a certain voltage output then sections 14 and 16 will have a corresponding voltage output and variations in the voltage supply source 11 will affect the output voltage from sections 14 and 16 in proportion to the turns ratio of each of them.

Section 14, at a given instant, will supply a current $i_m$ through the regulating element 17 and the load impedance 18, while simultaneously section 16 will cause a current $i_c$ to flow through load impedance 18 and the correcting impedance 22. Because of the series aiding connection between sections 14 and 16 the current $i_c$ flows through the load impedance 18 in a direction opposite to the current $i_m$ and hence, tends to cancel some of the current $i_m$. The reason for this is to be found in the nature of the regulating element 17, as depicted in the graph of Fig. 2.

Fig. 2 shows a current-voltage graph typical of iron hydrogen regulating elements and the like, such as element 17. The curve 23, shown as a solid line, is the curve which indicates the variation of current through such a regulating element when a voltage is applied thereacross. The current indicated by current 23 is also the current $i_m$ of Fig. 1.

As may be seen, the current increases sharply, but not necessarily linearly, as the voltage is increased from zero to a voltage indicated by the value 24. At this voltage value the current is at the value indicated by the reference character 26 and the current through the regulating element remains substantially at this level until the voltage in increased to a value indicated by the reference character 27. This relatively constant current is spoken of as the nominal regulated current of the regulating element 17 and its absolute value depends on the design and type of the regulator element chosen.

However, the current through the regulating element 17 does not remain precisely constant at the nominal value 26 throughout the voltage range from level 24 to level 27 but increases by an amount $\Delta i$, to a current value 28. The voltage range from level 24 to level 27 is considered the operating range of element 17 and the difference between these two voltage levels is indicated by the increment $\Delta e$. The ratio of $\Delta e$ to $\Delta i$ represents the operating impedance of regulating element 17 within its operating range.

Referring again to Fig. 1, it will be seen that the current $i_m$ flowing through load impedance 18 changes slightly as the voltage from winding section 14 changes from a nominal value in the operating range of the regulating element 17. In order to cancel out this small remaining variation in current $i_m$ an equal but opposite current $i_c$ is caused to flow through the load impedance 18. This current $i_c$ need not and in fact should not be regulated but should increase with an increase in the voltage supplied by source 11. Since the sections 14 and 16 both receive voltage which originates in source 11, it will be seen that current $i_c$ increases in direct proportion with current $i_m$. Current $i_m$ is the main current through load impedance 18 and current $i_c$ is merely a corrected current.

In order to adjust the variation of current $i_c$ properly with respect to the variation in the nominal value of current $i_m$ the value of the regulating impedance 22 added to the value of the load impedance 18 is adjusted so as to provide sufficient load across winding section 16 to limit the current $i_c$ for any given value of voltage supplied by source 11 to a value which is equal to the current variation in the nominal regulated current $i_m$ through load 18.

This is shown in Fig. 2 where the curve 29 of negative slope indicates the current $i_c$ and is made negative to indicate that current $i_c$ opposes the current $i_m$. The total current which flows through the load impedance 18 of Fig. 1 is thus the algebraic sum of currents $i_m$ and $i_c$ and is indicated by the dotted curve 31. As may be seen, this dotted curve 31 has substantially a uniform value throughout the operating region from voltage level 24 to voltage level 27.

Fig. 1 shows the invention as applied to alternating voltage circuits. If it is desired to operate with direct current to the load impedance 18 a pair of rectifying circuits may be inserted in the dotted box 32. These rectifying circuits are shown in Fig. 3 where the first rectifier comprises a diode 33 and a filter consisting of an inductance 34 and two condensers 36 and 37. The second rectifier circuit oppositely polarized to the first rectifier circuit comprises a diode 38 and a smoothing filter consisting of a choke 39 and two condensers 41 and 42.

It will be recognized that these are but two of many possible variations of the invention and that the full scope is to be determined by the following claims.

What is claimed is:

1. A current regulating circuit comprising a first series circuit and a second series circuit, said first series circuit comprising a first source of voltage, a load impedance, and a current regulating element; said second series circuit comprising a second source of voltage, a correcting impedance, and said load impedance, said first source of voltage being polarized to cause current to flow through said load impedance in one direction and said second source of voltage being polarized to cause current to flow through said load impedance in the opposite direction.

2. A current regulating circuit comprising a closed series loop comprising a first source of voltage, a current regulating element, and a load impedance; and a series branch comprising a second source of voltage and a correcting impedance, said branch being connected in parallel with said load impedance, said first and second sources of voltage being subject to simultaneous variations each in the same proportion to the magnitude of the nominal output voltage thereof, and said first and second sources of voltage being polarized to cause currents to flow through said load impedance in opposite directions.

3. A current regulating circuit comprising a closed series loop comprising a first voltage source having a first nominal output voltage but having voltage variations, a load impedance, and a current regulating element characterized by an internal impedance which allows only a relatively slight variation from a nominal current flowing through it for a relatively wide range of said voltage variations, said slight variation of current being in direct proportion to said voltage variations; and a series branch comprising a correcting impedance and a second voltage source having a second nominal output voltage and having voltage variations therein related to said first-named voltage variations by the ratio of said first nominal output voltage to said second nominal output voltage, said branch being connected in parallel with said load impedance, and said first and second voltage sources being polarized to cause currents to flow through said load impedance in oppostie directions, the sum of said load impedance and said correcting impedance bearing a relation to said second nominal output voltage such as to limit the current from said second voltage source to a value substantially equal and opposite to the variations in said nominal current.

4. A current regulating circuit comprising a source of alternating voltage having a nominal value by having variations therefrom; a transformer having a primary winding connected to said source to be energized thereby; a secondary winding on said transformer; a current regulating element comprising a first terminal connected to one terminal of said secondary winding; a load impedance comprising a first terminal connected to a second terminal of said regulating element and a second terminal connected to the other end of said secondary winding; an auxiliary winding comprising a first terminal connected to said second terminal of said secondary winding; and a correcting impedance comprising a first terminal connected to the junction of said regulating element in said load, and a second terminal connected to a second terminal of said auxiliary winding.

5. A current regulating circuit comprising a source of alternating voltage; a transformer comprising a primary winding connected to said source to be energized thereby, and a secondary winding comprising a first terminal, a second terminal and a third terminal intermediate said first and said second terminals; a first rectifier circuit connected to said first terminal and said intermediate terminal to rectify the voltage therefrom; a second rectifier voltage connected to said second terminal in said intermediate terminal to rectify the voltage therefrom, said first rectifier circuit comprising two oppositely polarized output terminals, said second rectifying circuit comprising two oppositely polarized output terminals, one output terminal of said first rectifying circuit being connected to the terminal of opposite polarity of said second rectifying circuit; a series circuit comprising a current regulating element and a load impedance, said series circuit being connected between said output terminals of said first rectifying circuit; and a correcting impedance having a first terminal connected to said free terminal of said second rectifying circuit and a second terminal connected to the junction of said regulating element in said load impedance.

No references cited.